Figure 1:
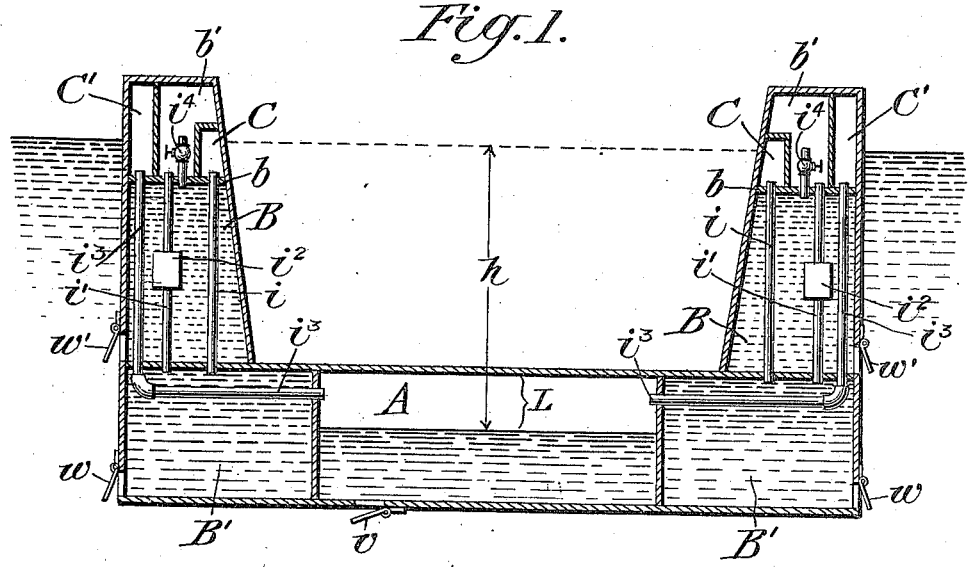

H. GIESE.
FLOATING DOCK.
APPLICATION FILED JUNE 6, 1907.

984,133.

Patented Feb. 14, 1911.

Witnesses.
C. B. Franzoni.
M. E. Burrell

Inventor.
Hans Giese
By Baldwin Wight
his attys

UNITED STATES PATENT OFFICE.

HANS GIESE, OF BERLIN, GERMANY.

FLOATING DOCK.

984,133. Specification of Letters Patent. Patented Feb. 14, 1911.

Application filed June 6, 1907. Serial No. 377,499.

*To all whom it may concern:*

Be it known that I, HANS GIESE, a subject of the Emperor of Germany, residing at Berlin, Germany, have invented certain new and useful Improvements in Floating Docks, of which the following is a specification.

This invention relates to that kind of floating or off-shore docks, comprising bottom pontoons and side caissons in which during the sinking of the dock air remains in a space partitioned off in the base pontoon for the purpose of obtaining a higher water level in the side caissons which correspond with the volume of the water displaced by the air in the bottom of the dock. Such docks have heretofore been constructed in which a tightly closed air chamber was arranged in the bottom pontoon between two chambers adapted to be filled with water to sink the dock and from which the water was expelled by compressed air in order to raise the dock. In such docks the air chamber being tightly closed, the contained air was always at atmospheric pressure and retained the same volume which was of such dimensions that the air in connection with the displacement of the dock nearly supported it when sunk, the water level in the side caissons of the dock being at this time only slightly below the external level. Docks have also been constructed in which the bottom pontoon is provided with a chamber into which water enters as the dock sinks and in which air is compressed by the entering water. The air is prevented from escaping and the lower the dock sinks the more the inclosed air is compressed, so that in raising the dock such compressed air self-actingly expels the contained water. Docks of this kind have heretofore been raised by pumping the water from other compartments of the dock. In such docks the air chamber has been made so large that the side caissons are nearly filled with water when the dock is lowered. In the docks above mentioned, the walls between the air chamber and the water chambers on opposite sides of it often suffer a considerable pressure from one side or the other. In the case of the dock first mentioned, there is exerted on the side walls of the air chamber the pressure of columns of water which reach to the water level of the side caissons where these are connected with the water chambers in the bottom pontoon while in the air chamber only atmospheric pressure exists. In the case of the other dock mentioned, an over-pressure is exerted on the walls of the air chamber which separate it from the adjacent water compartments because when these water compartments are emptied atmospheric pressure only is exerted in them against said partitions while in the air chamber a pressure is exerted corresponding to a column of water reaching from the level of the water in said air compartment to the water level outside the dock. In both cases, therefore, it has been necessary to make the partitions very strong and heavy, thus greatly increasing the cost and weight of the dock. In both cases also not only are the partitions between the air chamber and the adjacent water chambers subjected to full pressure of the outside water without receiving a corresponding counter pressure but all other walls in the bottom pontoon are subjected to a corresponding pressure. For this reason all the walls of the bottom pontoon have been made unusually strong and heavy.

By my invention I overcome the objections incident to both of the docks constructed as above specified.

Broadly stated, the present invention consists in emptying certain compartments of the dock by means of compressed air and in compressing air in another compartment during the lowering or sinking of the dock.

The invention also consists in other features of construction and operation which will be hereinafter described.

Figure 2:
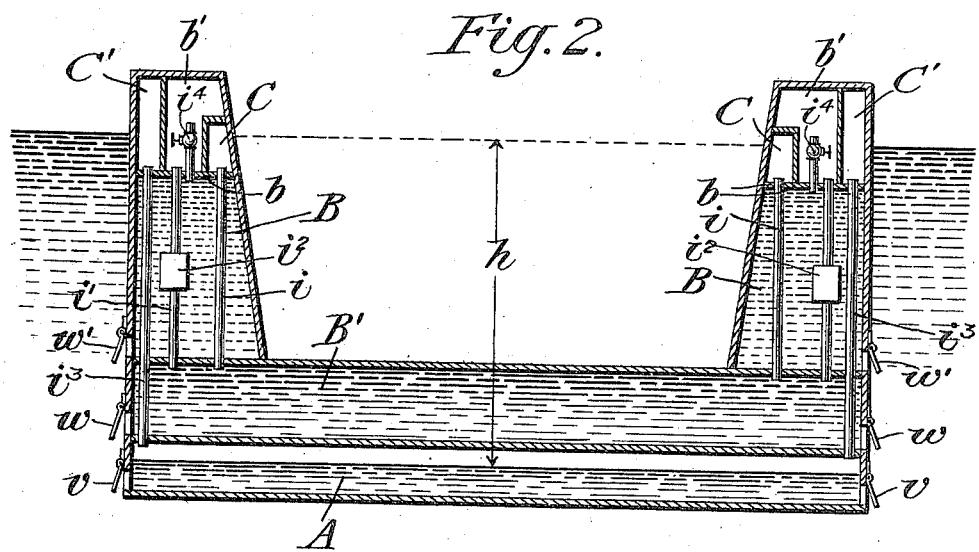

In the accompanying drawings:—Figure 1 shows a vertical central section through a dock embodying my improvements, the pipe connections being shown diagrammatically. Fig. 2 is a similar view of a modification.

In Fig. 1 the air chamber is located between water chambers in the bottom pontoon, while in Fig. 2 the air chamber extends fully across the bottom of the pontoon.

In Fig. 1 A represents the air chamber, B the side water chambers above the pontoon, and B' the side water chambers in the pontoon. The several chambers are separated from each other by suitable partitions and above the chambers B are other chambers b' separated from said chambers B by decks or partitions b. Within the chambers b' are located air compressors C and air reservoirs C'. Pipes $i$ connect the compressors with the chambers B', and pipes $i'$ connect the chambers B' with the chambers $b$. These pipes $i'$ are provided with throttling devices $i^2$ for a purpose hereinafter described. The air space in the chamber A is connected by pipes $i^3$ with the reservoirs C', and the chambers B are provided with vent pipes $i^4$ extending into the chambers $b'$. The compartments A, B and B' are provided with valves $v$, $w$, $w'$ of the kind commonly employed in this class of docks.

In order to obviate an excess of pressure from one side or the other on the walls between the chambers A and B' not only in the raising but also in the lowering of the dock the air must not be permitted to escape freely from the compartments B' but its escape must be regulated during the lowering of the dock in such manner that the water can enter said compartments with a velocity such that the pressure in said compartments B' is always only slightly less than that caused by the outer water. For this purpose, I provide suitable devices $i^4$ for throttling or regulating the passage of air from the said compartments.

By the arrangements described the compartment A can be made larger and the compartments B' materially smaller so that a relatively small quantity of water need be ejected in raising the dock.

The compartment A is preferably always made of such size that the air inclosed in it is compressed in the lowering of the dock to just that volume that it will keep the dock afloat when the water in the chambers B is only a little below the outer water level. It is clear, however, that the lowering of the dock when not carrying a ship or some other weight, cannot be effected by simply permitting water to enter it. In such case it is either necessary to pump water into the side caissons or to raise the required quantity in them with the unburdened dock. This the compressed air contained in the chamber A is not able to accomplish or this might be accomplished by raising the water that has entered the compartment A. In such case it is necessary to either release some of the compressed air in the compartment A after the latter has been closed or suck the air off as otherwise an over-pressure would result in the air compartment because of the decreasing pressure of the outer water in the compartments B', B'. By sucking off the compressed air its pressure may be preserved. It may be transferred to reservoir C' by pipes $i^3$. When the dock is lowered the pressure in the compartment A will have to be increased proportionately with the increased pressure of the outer water against the side walls of this compartment. This can either be done by forcing the required amount of compressed air into compartment A or by permitting the air previously drawn from it and stored up under higher pressure to reënter it.

The manner in which a dock embodying my improvements is operated will now be described. Assuming that the dock has been fully raised out of the water and is carrying a ship and that it is to be lowered and raised again with another ship; at first all the compartments of the dock are emptied and are subjected to atmospheric pressure only. To lower the dock water is permitted to enter the compartments A, B and B', the appropriate valves being opened for this purpose. As the compartments B' are filled with water air escapes from them through the pipes $i'$, but this escape of air is regulated or throttled in such manner that during the lowering of the dock the air pressure constantly increases but is always a little less than the pressure of the outer water so that the outer water may enter the compartments with sufficient speed. At the beginning of the operation, of course, the pressure of the water will be considerably higher that that of the air in the dock. From the side compartments B the air is released freely through the vents $i^4$ without any attempt at regulating its escape. The flow of water into the compartments B is regulated in such manner that its level is constantly nearly the same as that of the outer water. This of course may be accomplished by suitably controlling the valves $w'$. From the compartment A, which is connected with the air reservoirs C' by the pipes $i^3$, no air is at this time permitted to escape, but the air confined in the compartment A is compressed by the water entering the compartment from below.

As indicated in the drawing, the compartments B', B' are completely filled and the side caissons or compartment B are nearly filled with water when the dock is entirely lowered. At this time a quantity of air is confined in the compartment A sufficient to nearly carry the dock. The pressure of this confined air is equal to that of the outer water; that is, to that of the column of water indicated at $h$. There is therefore no overpressure resting on the walls of the compartment A from the outer water. In order that the air in compartment A be compressed to just the right volume its quantity must be calculated with exactness. It may happen that the compartment A is made too large so that the air confined in it is compressed in the lowering of the dock by the water alone to just that volume where its pressure is nearly equal to that of the outer water. In this case it will be necessary to increase the amount of air in the compartment from the storage reservoir C' or otherwise until the required pressure is obtained. In order to raise the dock again for the purpose of getting it ready for another vessel, compressed air is driven from the apparatus C into the compartments B' and the water is ejected from them. In order that the walls of the compartments B' shall not receive too great an over-pressure from the inside the pressure of the air driven into them should exceed only a little that of the outer water. Air is driven from the compressing apparatus C into the compartments B' through the pipes $i$. The valves of the compartment A should be kept closed so that no water can flow from it. This is done in order to lift the water so that the lowering of the unburdened dock after it has been prepared for another ship can be accomplished by simply letting the water enter the compartments B' which would not be possible without some weight burdening the dock; $i.\ e.$, that of the water lifted in the compartment A. As the lowered dock is nearly carried by the volume L of the air in the compartment A it is only necessary to eject a comparatively small quantity of the water from the compartments B' to raise the unburdened dock to such a height that its deck is just lifted above the surface of the water. This is sufficient to get the dock ready for another vessel. As none of the water that had entered compartment A when the dock was lowered is permitted to flow from it in the raising, the air confined in it would of course retain its high pressure corresponding to the water column $h$ and as the outer pressure would be lacking the side walls of the chamber A would have to stand too strong a strain. This of course should be prevented. As the dock is raised the air should be released from the compartment A through the pipes $i^3$ or sucked off and compressed under higher pressure into reservoirs for compressed air and again used for further operations. In order to lower the dock again after it has been made ready for another ship, the valves of the compartments B' are opened for the water to enter. Again the air from compartments B is permitted to escape freely and also as in the lowering, as described, the air from the compartments B' is released gradually, in such manner that its pressure is constantly nearly that of the outer water. There must be, however, between the two pressures a sufficient difference to allow the water to enter the compartments with a speed permitting the lowering of the dock in a reasonably short space of time. When thus operated harmful overpressure from the outer water on the walls of the compartments B and B' will be avoided. Corresponding to the way in which in the raising of the dock the air is to be gradually released from the compartment A so as to prevent too great an extent of the pressure against the side walls of this compartment over that of the outer water in the compartments B', so is the pressure in compartment A to be increased gradually by means of air being compressed into it in such manner that during this operation the walls of the compartment A shall not receive an injurious over-pressure and when the dock is completely lowered, the air confined in it shall have the same pressure which existed in the compartment after the operation of lowering first described; that is, when the compression in the compartment has been caused by the water entering it. As in the raising of the unburdened dock, so also in its lowering all its walls experience nearly the same pressure in case the operation is executed in the way above described.

If the dock is completely lowered and the ship to be docked has entered it so that the raising can take place, the valves of all compartments A, B and B' are opened and air is forced through the pipes $i$ into the compartments B' so that the water is ejected therefrom. As a result the dock rises and water flows from the compartments B by the action of gravity, while from the compartment A water is driven by the expansion of the air within it proportionately as the pressure of the outer water decreases. The rest of the water which would have remained in the compartment A after the dock has been completely raised is driven from it by air forced into it.

I claim as my invention:

1. A floating or off-shore dock, comprising a bottom pontoon having a chamber into which water passes while lowering the dock and in which air is compressed by the entering water, a chamber to which water is admitted for sinking the dock, and means for forcing compressed air into said last-mentioned chamber to expel the water therefrom while water is being at the same time expelled from the first-mentioned chamber by the air compressed therein.

2. A floating or off-shore dock, comprising a bottom pontoon having a chamber into which water passes while lowering the dock and in which air is compressed by the entering water, a chamber to which water is admitted for sinking the dock, means for throttling the escape of air therefrom to equalize the internal pressure with that of the outside, and means for forcing compressed air into said last-mentioned chamber to expel the water therefrom, to raise the dock while water is being at the same time expelled from the first-mentioned chamber by the air compressed therein.

3. A floating or off-shore dock, comprising a bottom pontoon having a chamber into which water passes while lowering the dock and in which air is compressed by the entering water, means for permitting some of the air to escape from said chamber while lowering the unloaded dock, a chamber to which water is admitted for sinking the dock, and means for expelling the water therefrom to raise the dock while water is being at the same time expelled from the first-mentioned chamber by the air compressed therein.

4. A floating or off-shore dock, comprising a bottom pontoon having a chamber into which water passes while lowering the dock and in which air is compressed by the entering water, means for closing said chamber to confine water therein during the raising of the unburdened dock, and means for withdrawing air from said chamber and storing it for the purpose specified.

5. A floating or off-shore dock, comprising chambers to which water is admitted during the sinking of the dock, means for throttling the escape of air from said chambers while they are being filled with water, and means for forcing compressed air into said chambers to empty them of water when raising the dock.

In witness whereof I have hereunto set my hand in presence of two witnesses.

HANS GIESE.

Witnesses:
  WOLDEMAR HAUPT,
  HENRY HASPER.